(12) United States Patent
Schauerte et al.

(10) Patent No.: US 7,283,985 B2
(45) Date of Patent: Oct. 16, 2007

(54) PRIORITIZING PRODUCT INFORMATION

(75) Inventors: Christiane Schauerte, Heidelberg (DE); Mathias Knura, Speyer (DE); Stefan Krebs, Mannheim (DE)

(73) Assignee: SAP A.G., Walldorf (DE)

( * ) Notice: Subject to any disclaimer, the term of this patent is extended or adjusted under 35 U.S.C. 154(b) by 593 days.

(21) Appl. No.: 10/815,793

(22) Filed: Apr. 2, 2004

(65) Prior Publication Data

US 2005/0108193 A1 May 19, 2005

Related U.S. Application Data

(60) Provisional application No. 60/515,268, filed on Oct. 29, 2003.

(51) Int. Cl.
*G06F 7/00* (2006.01)

(52) U.S. Cl. ............... 707/1; 707/102; 707/3; 707/9; 707/4; 707/201; 705/1

(58) Field of Classification Search .......... 707/4, 707/1
See application file for complete search history.

(56) References Cited

U.S. PATENT DOCUMENTS

| | | | |
|---|---|---|---|
| 5,765,143 A | 6/1998 | Sheldon et al. | |
| 6,253,187 B1 | 6/2001 | Fox | |
| 6,343,275 B1 * | 1/2002 | Wong | 705/26 |
| 6,550,674 B1 | 4/2003 | Neumark | |
| 6,561,417 B1 | 5/2003 | Gadd | |
| 6,567,824 B2 | 5/2003 | Fox | |
| 2002/0188499 A1 * | 12/2002 | Jenkins et al. | 705/10 |
| 2003/0028507 A1 * | 2/2003 | Pauliks et al. | 707/1 |
| 2003/0033205 A1 * | 2/2003 | Nowers et al. | 705/26 |
| 2003/0163364 A1 | 8/2003 | Piercy et al. | |
| 2003/0187665 A1 * | 10/2003 | Boyd | 705/1 |
| 2003/0221107 A1 * | 11/2003 | Kang | 713/176 |
| 2004/0117235 A1 * | 6/2004 | Shacham | 705/10 |
| 2004/0193545 A1 * | 9/2004 | Shlasky | 705/59 |
| 2005/0027611 A1 * | 2/2005 | Wharton | 705/26 |

FOREIGN PATENT DOCUMENTS

WO  WO 02/35394  5/2002

* cited by examiner

*Primary Examiner*—Wilson Lee
*Assistant Examiner*—Binh V Ho
(74) *Attorney, Agent, or Firm*—Fish & Richardson P.C.

(57) ABSTRACT

A user of a computer is able to define and manage partner-product ranges in which each partner-product range is associated with products, business partners and a priority indicator. When a particular business partner or a particular partner-product combination is associated with multiple partner-product ranges, the priority indicator of each of the multiple partner-product ranges is used to determine which of the multiple partner-product ranges is to be applied to the business partner or the particular partner-product combination, respectively. In this way, a user may define a partner-product range that applies to one or more partner-product combinations or one or more business partners that otherwise would be covered by another partner-product range.

21 Claims, 10 Drawing Sheets

PRIORITIZING PRODUCT INFORMATION

CROSS-REFERENCE TO RELATED APPLICATIONS

This application claims priority from U.S. Provisional Application No. 60/515,268, filed on Oct. 29, 2003, and titled "Prioritization for Partner Product Ranges," which is incorporated by reference in its entirety.

TECHNICAL FIELD

This description relates to automated processing of product information and customer information.

BACKGROUND

Computer systems often are used to manage and process business data. To do so, a business enterprise may use various application programs running on one or more computer systems. Application programs may be used to process business transactions, such as taking and fulfilling customer orders and providing supply chain and inventory management.

One type of application program is a customer relationship management (CRM) system that is designed to track relationships between a business and its customers. In some CRM systems, a user may identify the products that may be sold by or purchased by a business entity, such as a customer or a sales organization (either or both of which may be referred to as a business partner). The identification of particular products that may be sold by or purchased by particular business partners may be referred to as a partner-product range, a partner-product indication, or a partner-product association. The identification of a particular product that may be sold by or purchased by a particular business partner may be referred to as a partner-product combination. In some CRM systems, products may be organized into categories and/or a hierarchy, as may business partners. This may make identifying a partner-product range that applies to many products and many business partners more efficient. This may be particularly true when products associated with a particular partner-product range are identified based on a product category or a node in a product hierarchy with which many products are associated, or when business partners associated with a partner-product range are identified based on a business partner category or a node in a hierarchy of business partners with which many business partners are associated. This may help to minimize, perhaps substantially minimize, the human effort required to create and revise partner-product ranges. This, however, may be difficult to later identify a different product-partner range that applies to a partner-product combination or a business partner covered by the previously identified partner-product range without modifying the previously identified partner-product range or entering additional partner-product ranges, often many additional partner-product ranges.

For example, in a consumer products sales context, many different products may be sold by many sales outlets that are commonly owned or operated. In some cases, many, but not all, of the same products are sold by each sales outlet. In addition, even when all of the sales outlets sell the same products, some products may be sold at only a particular time of year (such as seasonal products) or sold at a special price for a particular period of time. When some of the sales outlets sell different products, temporarily offer a special product, or temporarily offer a special price, a user of the CRM system may not be able to define a partner-product range that applies to many products and many business partners. Instead, because the user of the CRM system is no longer able to take advantage of defining a partner-product range high in a business partner hierarchy or another manner of defining a partner-product range that applies to many business partners and/or many products, the user of the CRM system may need to manually define many partner-product ranges to reflect the different products or prices at some of the sales outlets and also define many partner-product ranges to reflect the original products and prices sold at other sales outlets. In the case of many consumer product contexts, including grocery store chains, there many be hundreds or even thousands of products sold at sales outlets. Defining partner-product ranges in such a case may require significant human effort.

SUMMARY

The invention enables a user of a computer to define and manage partner-product ranges in which each partner-product range is associated with products, business partners and a priority indicator. When a particular business partner or a particular partner-product combination is associated with multiple partner-product ranges, the priority indicator of each of the multiple partner-product ranges is used to determine which of the multiple partner-product ranges is to be applied to the business partner or the particular partner-product combination, respectively. In this way, a user may define a partner-product range that applies to one or more partner-product combinations or one or more business partners that otherwise would be covered by another partner-product range. The partner-product range also may be associated with other information, such as a date range for which the partner-product range is valid, a distribution channel for the identified products, and a location in which the products are sold, to limit the application of the partner-product range.

In one general aspect, associations of products and business entities in a data collection are prioritized. Information is received that associates a particular product identified in the data collection with a particular business entity identified in the data collection. The particular business entity also is associated in the data collection with multiple data entries. Each of the multiple data entries identifies one or more product associations with the particular business entity and is associated with a priority indication. The multiple data entries are stored in the data collection for use in determining, in response to a received request, which of the multiple data entries associated with the particular business entity includes a higher priority indication. The data entry of the multiple data entries that includes the higher priority indication is used to determine whether a product identified in the data collection is associated with the particular business entity.

Implementations may include one or more of the following features. For example, multiple priority indications may be received in which each of the multiple priority indications is associable with a data entry of the multiple data entries. The multiple priority indications may be received before the information associating the particular product identified in the data collection with the particular business entity identified in the data collection is received.

Products identified in the data collection may be associated with one of multiple product categories. If so, a data entry associated with the particular business entity may identify at least one of the product associations based on an association of a product identified in the data collection with one of the multiple product categories.

Business entities identified in the data collection may be associated with one of multiple business entity categories. If so, a data entry associated with the particular business entity may identify the particular business entity based on an association of the particular business entity identified in the data collection with one of the multiple product categories.

Business entities identified in the data collection may be organized into a business entity hierarchy. If so, a data entry associated with the particular business entity may identify the particular business entity based on an association of the particular business entity with another business entity in the business entity hierarchy.

Products identified in the data collection may be organized into a product hierarchy. If so, a data entry associated with the particular business entity may identify at least one of the product associations based on an association of the product with another product in the product hierarchy.

The information received may include a validity period. If so, a data entry that includes the validity period may be used to determine which of the multiple data entries is to be used.

A data entry associated with the particular business entity may indicate that the particular business entity is, or is not, permitted to sell a product identified by the one or more product associations. Similarly, a data entry associated with the particular business entity may indicate that the particular business entity is, or is not, permitted to purchase a product identified by the one or more product associations.

Implementations of the techniques discussed above may include a method or process, a system or apparatus, or computer software on a computer-accessible medium. The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
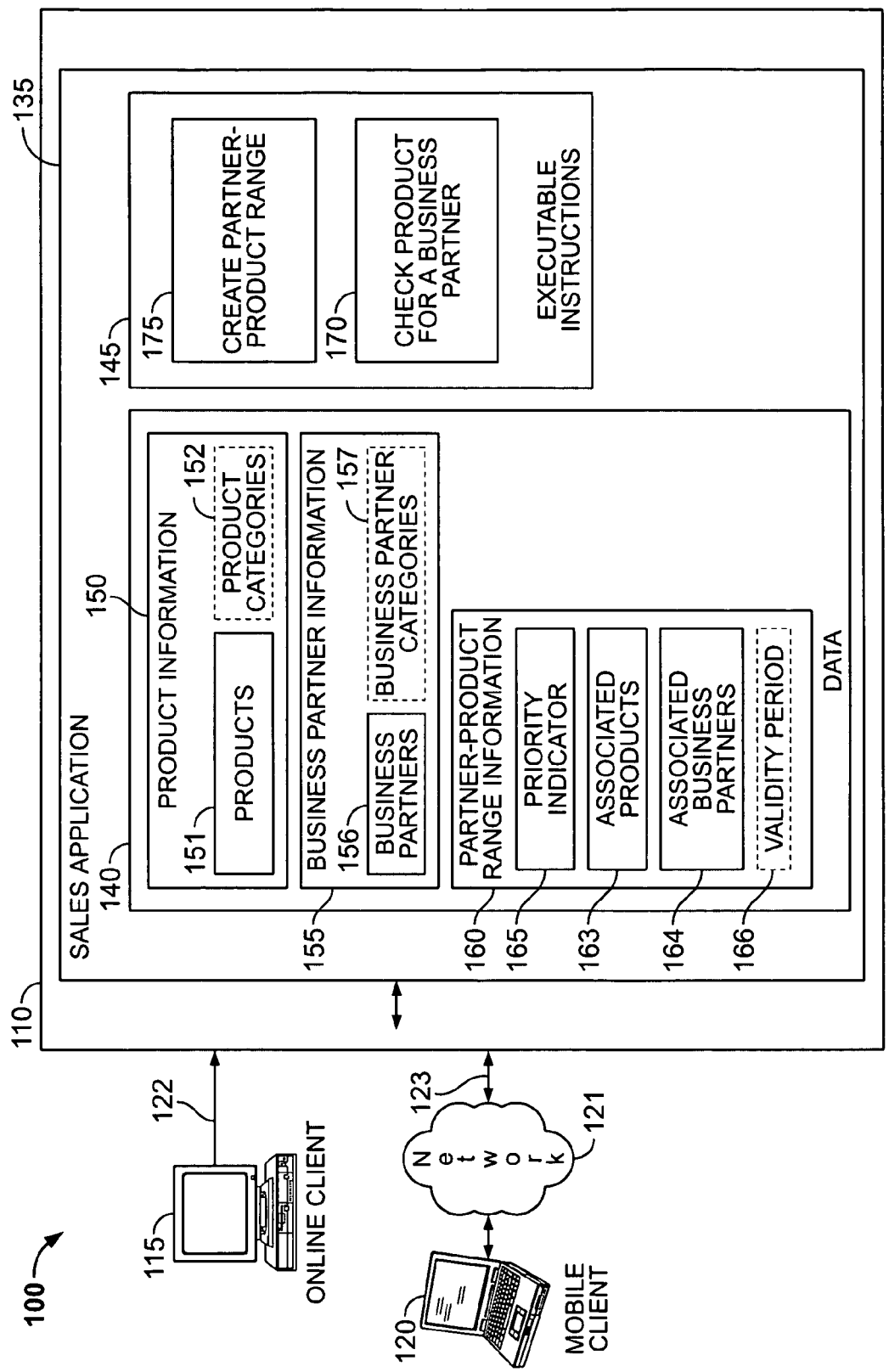
FIG. 1 is a block diagram of a system for prioritizing product information incorporating various aspects of the invention.

FIG. 1 shows a system 100 for prioritizing product information for business partners in accordance with the invention. In one example, the system 100 may be used to help manage a sales organization having multiple sales outlets by identifying the products permitted to be sold at each sales outlet. In some cases, a product may be sold during a limited period of time or may have a different price for a limited period of time at one of the sales outlets. For example, a business partner may be an entity that sells one or more products or may be a customer that buys one or more products. The system 100 includes a computer system 110, an online client computer 115, and a mobile client computer 120, all of which are capable of executing instructions on data.

In more detail, the computer system 110 and the client computers 115 and 120 may be arranged to operate within or in concert with one or more other systems, such as, for example, a network 121, which may be one or more LANs ("Local Area Networks") and/or one or more WANs ("Wide Area Networks"). The online client computer 115 may be a general-purpose computer that is capable of operating as a client of the application program (e.g., a desktop personal computer, a workstation, or a laptop computer running an application program), or a more special-purpose computer (e.g., a device specifically programmed to operate as a client of a particular application program). The online client computer 115 uses a wired or wireless communication pathway 122 to communicate with the computer system 110. The mobile client computer 120 may be a general-purpose computer, a special-purpose computer, or another type of mobile computing device, such as personal digital assistant (PDA), and the mobile client computer 120 uses a wired or wireless communication pathway 123 to communicate with the computer system 110. For brevity, FIG. 1 illustrates only a single online client computer 115 and a single mobile client computer 120 for system 100. As is conventional, the computer system 110 includes a sales application 135 having application data 140 and executable instructions 145. In some implementations, the mobile client computer 120 may store a portion of application data 140 that is used for sales order processing (rather than using the mobile computing device to access application data 140 stored on the computer system 110) and periodically send to, and receive from, the computer system 110 updated application data over the network 121.

The application data 140 includes product information 150, business partner information 155, and partner-product range information 160 for the sales application 135. The product information 150 includes information 151 associated with a particular product and product categories 152 that identify multiple products that are grouped into a product category. The information 151 for a particular product identifies the particular product, such as by using a bar code or an radio frequency identification (RFID) tag, a unique product identifier or a product name. Additionally, the information 150 for a particular product may include a product description, a sales price associated with the product, and/or identify a product category in the product categories 152 to which the product is associated.

The business partner information 155 of the application data 140 includes information 156 relating to a particular business partner and the business partner categories 157 that identify multiple business partners that are grouped into a business partner category. The information 156 for a particular business partner identifies the business partner, such as by using a unique business partner identifier or name. Additionally, information 156 for a particular business partner may include a business partner description and/or identify a business partner category of the business partner categories 157 with which the business partner is associated.

Each partner-product range in the partner-product range information 160 applies to one or more of the products 151 in product information 150 and one or more of the business partners 156 in business partner information 155. Associated products 163 identifies one or more of the products 151 in product information 150 to which a particular partner-product range applies. Similarly, associated business partners 164 identifies one or more of the business partner 156 to which a particular partner-product range applies. Each partner-product range of partner-product range information 160 also includes a priority indicator 165 that may be used to identify which one of multiple priority partner-product ranges applicable to a particular partner-product combination or a particular business partner is to be used. This may enable a user to define a partner-product range that is temporarily used without modifying an existing partner-product range. This may be particularly useful when an existing partner-product range applies to many products and/or many business partners.

The computer system 110 includes a process 170 to check whether one or more partner-product ranges exist for a particular product and a particular business partner combination. When multiple partner-product range are applicable the business partner or for the partner-product combination, the process 170 determines, based on a comparison of the priority indicators associated with each applicable partner-product range, which of the applicable partner-product ranges is to be used. One example of the process 170 is described in FIG. 5.

The computer system 110 also includes a process 175 for creating a partner-product range that identifies one or more products, one or more business partners, and a priority indicator used to identify which of partner-product ranges that apply to a particular partner-product combination should be used. One example of the process 175 is described in FIG. 4.

Figure 2:
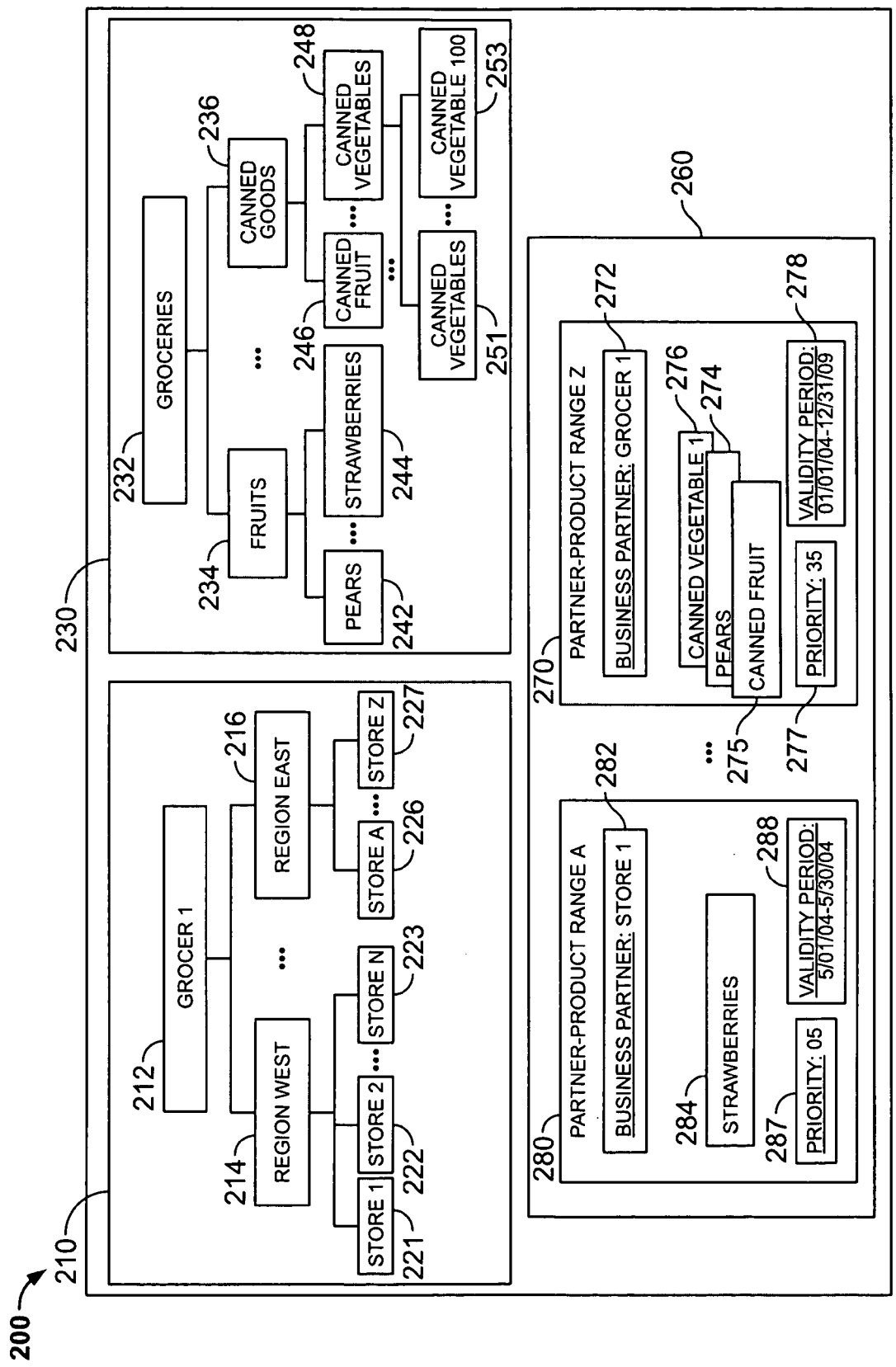
FIG. 2 is a diagram of an example representation of a business partner hierarchy, a product hierarchy, and partner-product ranges for business partners in the business partner hierarchy and products in the product hierarchy.

Before discussing the additional detail regarding the method by which partner-product ranges of FIG. 1 are created and used, it is first helpful to describe an example representation of data related to partner-product ranges as well as an example format that may be used for partner-product ranges. FIG. 2 depicts an example representation of a portion of a business partner hierarchy 210, a portion of a product hierarchy 230, and an example of partner-product ranges 210 having priority indicators. The partner-product ranges apply to some of the business partners in the business partner hierarchy 210 and some of the products in the product hierarchy 230.

More particularly, the portion of the business partner hierarchy 210 includes a root business partner node 212 that represents the highest level in the portion of the business partner hierarchy 210 and as such does not have a parent item in the portion of the business partner hierarchy 210. The root business partner node 212 is associated with child nodes 214 and 216 that each represent a business partner category. The child nodes 214 and 216 are lower than the root business partner node 212 in the portion of the business partner hierarchy 210 and may be referred to as the first level of the portion of the business partner hierarchy 210. The child node 214 in turn is a parent node to the child nodes 221-223 at the second level of the portion of the business partner hierarchy 210. Similarly, the child node 216 is a parent node to the child nodes 226 and 227 also at the second level of the portion of the business partner hierarchy 210. In this example, the root node 212 represents a business partner that owns or operates stores in a grocery store chain. The child node 214 represents a business partner category of "Region West" used to group the stores represented by nodes 221-223, and the child node 216 represents a business partner category of "Region East" used to group stores represented by nodes 226-227.

The portion of the product hierarchy 230 includes a root product node 232 that represents the highest level in the portion of the product hierarchy 210 and as such does not have a parent item in the portion of the product hierarchy 230. The root product node 232 is associated with child nodes 234 and 236 at the first level of the portion of the product hierarchy 230. The child node 234 in turn is a parent node to the child nodes 242 and 244 at the third level of the portion of the product hierarchy 230. Similarly, the child node 236 is a parent node to the child nodes 246 and 248 also at the second level of the portion of the product hierarchy 230. The child node 248 includes child nodes 251 and 253 that each represent particular products, whereas the child nodes 234, 236, 246 and 248 represent product categories. As shown by the ellipsis marks ("...") in the portion of the product hierarchy 230, only some of the nodes representing product categories or particular products in the portion of the product hierarchy 230 are illustrated.

More particularly, the root node 232 represents a product category that groups all grocery products in the portion of the product hierarchy 230. The child node 234 represents a product category of "Fruits" used to group particular products represented by nodes 242 and 244, and the child node 236 represents a product category of "Canned Goods" used to group a product category of "Canned Fruit" represented by node 246 and a product category of "Canned Vegetables" represented by node 248. The child node 248 in turn groups particular products represented by nodes 251 and 253.

In general, each of the partner-product ranges 260 is associated with a node in the portion of the business partner hierarchy 210 and one or more nodes in the portion of the product hierarchy 230. Each of the partner-product ranges 260 also includes a validity period and priority.

More particularly, the partner-product range 270 is associated with the business partner node 212, as indicated by business partner 272 in the partner-product range 270. As such, the partner-product range 270 is applicable to the business partner node 212 and any node for which the business partner node 212 is, directly or indirectly, a parent. Thus, the partner-product range 270 applies to the business partner nodes 212, 214, 216, 221-223, 226 and 227. The partner-product range 270 also is associated with the product nodes 242, 246 and 248, as indicated by products 274, 275 and 276, respectively, in the partner-product range 270. As such, the partner-product range 270 is applicable to the product nodes 242, 246, 248 as well as the product nodes 251 and 253 that are child nodes of the node 248. The partner-product range 270 also includes a priority 277 having a value of "35" and a validity period 278. The partner-product range 270 indicates that, for any date that occurs within the validity period 278, any of the stores represented by nodes 221-223 or 226-227 are permitted to sell pears (represented by node 242), any canned fruit product that is directly or indirectly related to node 246, or any canned vegetable product (here represented by nodes 251 and 253). The partner-product range 270 also implicitly indicates that other products, including strawberries represented by node 244, are not permitted to be sold by the stores to which the partner-product range 270 applies. This is because the node 244 is not directly or indirectly associated with a node in the portion of the product hierarchy 230 identified by products 274-276 in the partner-product range 270.

The partner-product range 280 also is associated with a particular store (here represented by node 221 in the portion of the business partner hierarchy 210), as indicated by the business partner 282 in the partner-product range 280. The partner-product range 280 is associated with the product node 244, as indicated by the product 284 in the partner-product range 280. In contrast to the partner-product range 270, the partner-product range 280 only applies to one store and one product. Like the partner-product range 270, the partner-product range 280 is associated with a priority 287 (here, "05") and a validity period 288. The partner-product range 280 indicates that, for any date within the validity period 288, the store represented by node 221 is permitted to sell the product represented by node 244. In this implementation, a priority having a lower numeric value represents a higher priority than a priority having a higher numeric value. For example, a priority having a value of "1" represents a higher priority than a priority having value of "10."

In the one example, the partner-product ranges 270 and 280 may be used to determine whether the store represented by node 221 is permitted to purchase the product represented by node 244. The partner-product range 270 applies to the store and indicates that the product represented by node 244 is not permitted to be sold by the store. This is because the partner-product range 270 only applies to product nodes 226, 246, 248, 251 and 253, as described above. However, because, as described above, the priority 287 (here, "05") of partner-product range 280 is higher than the priority 277 (here, "35") of partner-product range 270, the partner-product range 270 is not used to determine whether the store is permitted to sell the product represented by node 224. Instead, the partner-product range 280 is used. As described above, the partner-product range 280 indicates that the store represented by node 221 is permitted to sell the product represented by node 224.

Thus, in this example, the partner-product range 270 applies to (or covers) all of the stores included in the portion of the business partner hierarchy 212 (here, representing a grocery store chain) and covers a large number of products that may be sold by any of the stores. The partner-product range 280 applies to only one store and one product. Because the priority 287 of the partner-product range 280 is higher than the priority 277 of the partner-product range 270, the partner-product range 280 is used to determine whether the one product covered by the partner-product range 270 is permitted to be sold by the one store covered by the partner-product range 270.

In some implementations, a product partner range that applies to a business partner and a product is only overruled by another partner-product range having a higher priority that also applies to both the business partner and the product. Using the example described above, the store represented by node 221 (here, store 1) is permitted to sell the product represented by node 244 (here, strawberries) because the partner-product range 280 indicates that store 1 is permitted to sell strawberries and partner-product range 270 does not apply to strawberries. Because the partner-product range 270 does not cover strawberries, there is no need to compare the priorities 287 and 277 of the partner-product ranges 270 and 280 to determine whether the store 1 is permitted to sell strawberries. In this implementation, even in a case where partner-product range 280 had a lower priority 287 than the priority 277 of the partner-product range 270, store 1 would be permitted by partner-product range 280 to sell strawberries.

In some implementations, partner-product ranges may be used to generate a list of all products that are associated with a business partner. Particular products from the list of all products for a business partner may be selected and used in a part of a business process. In one example, particular products may be selected from a list of all products that may be purchased by a business partner for inclusion in a sales order by the business partner. This may be a more convenient or efficient manner of identifying products for a sales order than identifying products from a general list of all products available, some of which the business partner may not be permitted to purchase.

Figure 3:
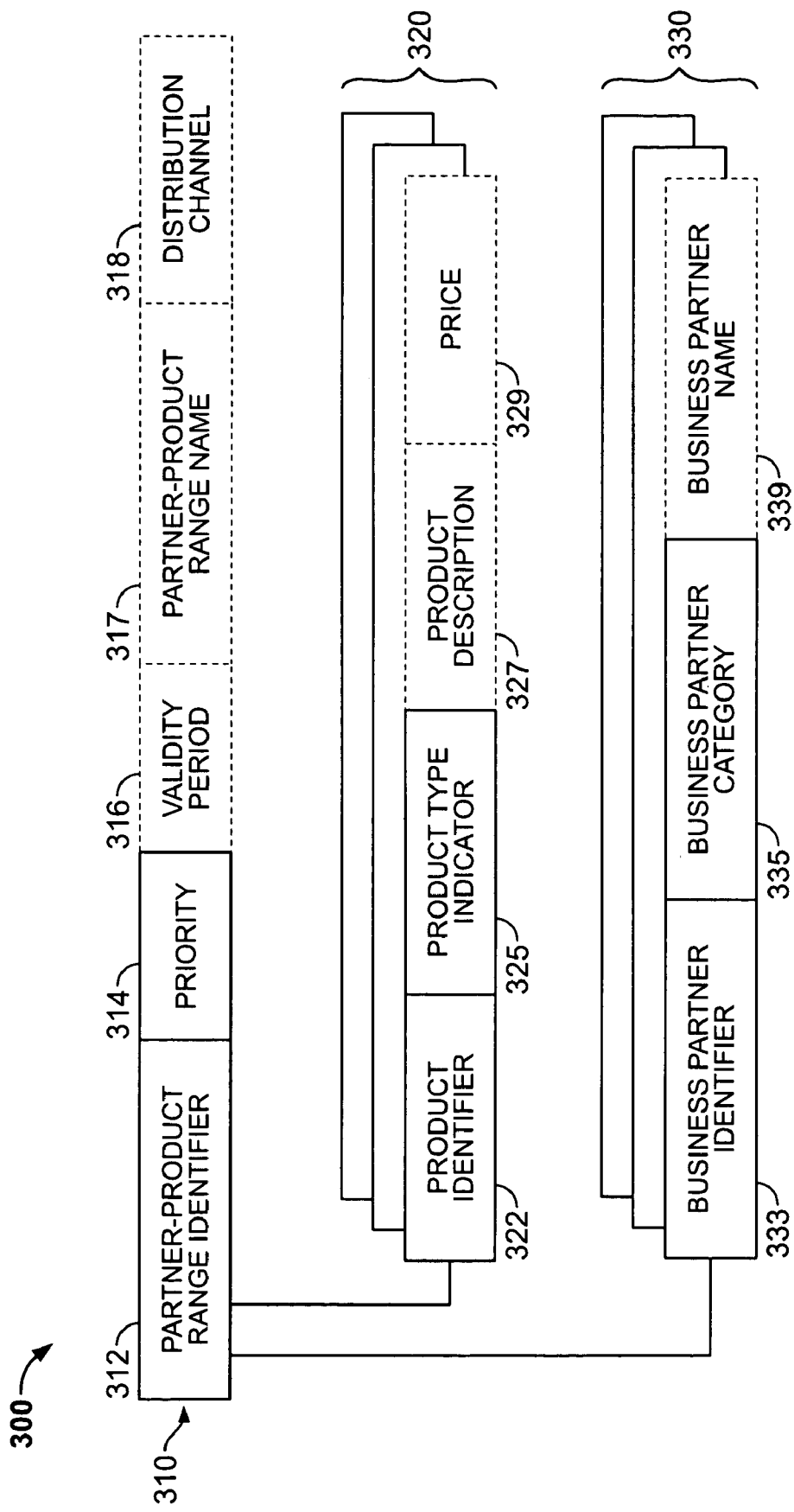
FIG. 3 is a diagram illustrating a data structure for a partner-product range.

Referring to FIG. 3, an example data structure 300 or format for a partner-product range is shown in simplified form. The data structure 300 may be used to implement a partner-product range in the partner-product range information 160 in FIG. 1. The data structure includes partner-product range information 310 having a partner-product range identifier 312 that uniquely identifies a particular partner-product range. The partner-product range information 310 also includes a priority 314 for a particular partner-product range and an optional validity period 316. The partner-product range information 310 also may include a partner-product range name 317 for the particular partner-product range or a distribution channel identifier and a distribution channel identifier 318. The distribution channel identifier may help to further define the scope to which the partner-product range applies.

The partner-product range information 310 is associated with one or more entries of product information 320, which may be an implementation of associated products 163 in FIG. 1. Each entry of product information 320 includes a product identifier 322 that uniquely identifies a product associated with the partner-product range identified by the partner-product range identifier 312. Each entry of product information 320 also includes a product type indicator 325 that identifies a product category, such as one of the product categories 152 in FIG. 1, to which the product identified by the product identifier 322 belongs. The product information 320 also may include a product description 327 that describes the product and a price 329 applicable to the product. In some implementations, a product type indicator 325 may be used in lieu of a product identifier 322. In such a case, the partner-product range identified by the partner-product range identifier 312 applies to all products associated with the product type indicator 325 (unless the partner-product range is not applied because of another partner-product range with higher priority).

The partner-product range information 310 is associated with one or more entries of business partner information 330, which may be an implementation of associated business partners 164 in FIG. 1. Each entry of business partner information 330 includes a business partner identifier 333 that uniquely identifies a business partner associated with the partner-product range identified by the partner-product range identifier 312. Each entry of business partner information 330 also includes a business partner category 335 that identifies a business partner category, such as one of the business partner categories 157 in FIG. 1, to which the business partner identified by the business partner identifier 333 belongs. Each entry of business partner information 330 also may include a business partner name 339 for the business partner. In some implementations, a business partner category 335 may be used in lieu of a business partner identifier 333. In such a case, the partner-product range applies to all business partners associated with the business partner category 335 (unless the partner-product range is not applied to a business partner because of another partner-product range with higher priority).

In one implementation, the partner-product range information 310 is a header record for a partner-product range. Each of the product information 320 and the business partner information 330 are detail records associated with the header record.

Figure 4:
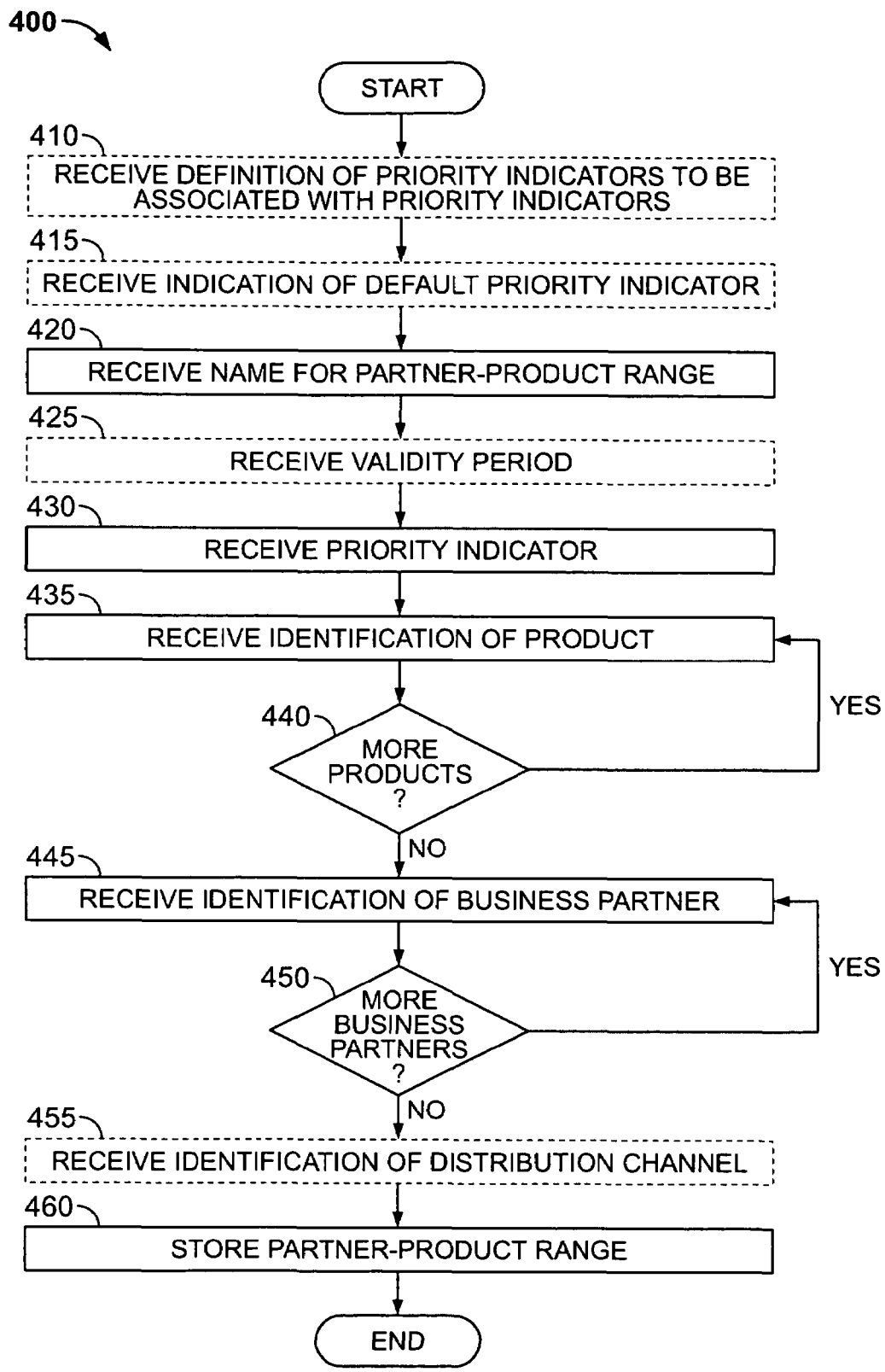
FIG. 4 is a flow chart showing a process for creating a partner-product range.

FIG. 4 illustrates a process 400 for creating a partner-product range. The process 400 may be performed by a processor on a computer system, such as the computer system 110 in FIG. 1. The processor is directed by a method, script or other type of computer program that includes instructions for performing the process 400 to create a partner-product range. An example of a collection of executable instructions is the process 175 to create a partner-product range in FIG. 1. The process 400 may be manually initiated by a system administrator, a business analyst, a sales manager or another type of user, who also may enter data received during the process 400.

In the implementation illustrated by the process 400, definitions of multiple priority indicators that may be associated with one or more partner-product ranges are received by the processor (step 410). In one example, each of the definitions of priority indicators is associated with a numeric value. In this example, a low numeric value corresponds to a low priority value and a high numeric value corresponds to a high priority value. In another example, each of the definitions of priority indicators is associated with one of multiple categories, such as high, medium or low. The processor also optionally receives an indication of which of the multiple priority indicators defined in step 410 is to be used as a default priority indicator to be associated with a partner-product range created using the process 400. (step 415). Steps 410 and 415 need not be performed every time a new partner-product range is created. Typically, priority indicators are defined for later association with a partner-product range and an indication of an optional default priority indicator is initially performed when an application program using the partner-product range is first installed and the definition of priority indicators available for association with partner-product ranges is revised infrequently.

The processor optionally may receives a name for the partner-product range being created (step 420). The processor also may receive additional information to be associated with the partner-product range, such as a validity period for the partner-product range (step 425).

The processor receives one priority indicator of the priority indicators defined in step 410 to be associated with the partner-product range (step 430). This may be accomplished, for example, by the processor displaying the priority indicators that may be selected by the user and receiving an indication of one of the displayed priority indicators that is selected by the user. In another example, the processor may access a default priority indicator that is assigned in step 415 when an indication of a priority indicator is not otherwise received.

The processor also receives an identification of a product or products to be associated with the partner-product range (step 435). The product identification received may identify a particular product (such as when a product identifier or a product name is received) or multiple products (such as when a product category or a node in a product hierarchy that is directly or indirectly associated with multiple products in the product hierarchy is received). The processor may perform step 435 repeatedly until the processor receives an indication that all products have been identified for the partner-product range (step 440).

The processor also receives an identification of a business partner or business partners to be associated with the partner-product range (step 445). The business partner identification received may identifier a particular business partner (such as when a business partner identifier or a business partner name is received) or multiple business partners (such as when a business partner category or a node in a business partner hierarchy that is directly or indirectly associated with multiple business partners in the business partner hierarchy is received). The processor may perform step 450 repeatedly until the processor receives an indication that all business partners have been identified for the partner-product range (step 450).

The processor also may receive additional information for the partner-product range. One example is when the processor receives the identification of a distribution channel that is to be associated with the partner-product range and used to further limit the cases in which the partner-product range is to be applied (step 455).

The partner-product range is stored for later use in determining which of multiple partner-product range is to be used for a particular business partner or a partner-product combination (step 460). The partner-product range may be stored in persistent storage.

Figure 5:
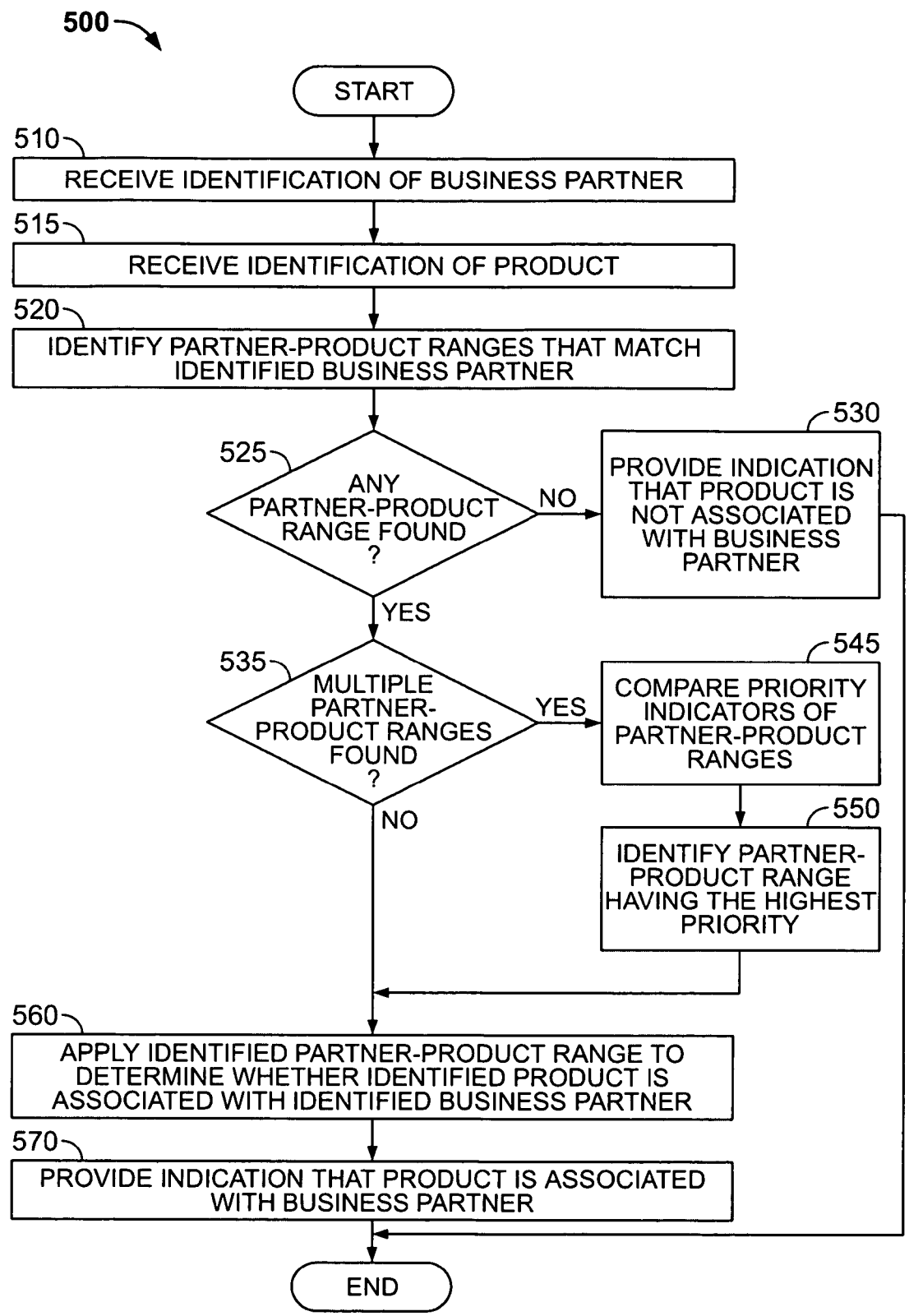
FIG. 5 is a flow chart illustrating a process for using a partner-product range to determine whether a business partner is associated with a particular product.

FIG. 5 illustrates a process for using a partner-product range to determine whether a business partner can sell a product. The automated process 500 may be performed by a processor on a computer system, such as the computer system 110 in FIG. 1 The processor is directed by a method, script or other type of computer program that includes instructions for performing the process 500. An example of such a collection of executable instructions is the process 170 to check a product for a business partner in FIG. 1. The process 500 may be initiated programmatically, such as when a computer program calls or otherwise initiates another computer program, method or function that includes instructions for performing the process 500. One example of a context in which the process 500 may be programmatically initiated may occur when a sales order or quotation is checked to ensure that the customer is permitted to purchase the products identified in the sales order or quotation.

The processor receives an identification of a business partner (step 510) and an identification of a product (step 515). Examples of the type of identifications received include a business partner identifier, a business partner name, a product identifier, or a product name. In one example in the context of programmatically initiating the process 500, the identification of a business partner and the identification of a product may be received as parameters for a computer program or function having instructions for performing the process 500. In an example in the context of manually initiating the process 500, a user may identify a business partner by selecting a business partner from a display of multiple business partners and may identify a product by selecting a product from a display of multiple products. The identification of the selected business partner and the selected product is received by the processor.

The processor identifies partner-product ranges, if any, that match the received identification of a business partner (step 520). When no partner-product range is identified (step 525), the processor may provide an indication that a partner-product range does not apply to the identified business partner (step 530) and the process 500 ends. The indication that a partner-product range does not apply to the identified business partner may be accomplished by displaying an error message or by returning a particular value to a calling computer program.

When multiple partner-product ranges are applicable to the identified business partner, the processor compares priority indicators of the identified partner-product ranges (step 545) and identifies the partner product range having the highest priority to be used to determine whether the product identified in step 515 is associated with the business partner identified in step 510 (step 550). When only one partner-product range is applicable to the identified business partner (as is necessarily the case when neither some partner-product ranges have been identified in step 525) and multiple partner-product ranges have not been found in step 535), the identified partner-product range is used to determine whether the product identified in step 515 is associated with the business partner identified in step 510 (step 550).

The processor applies the identified partner-product range to determine whether the identified product is associated with the identified business partner (step 560). This may be accomplished, for example, by comparing each of the product identifiers associated with the partner-product range with the identified product received in step 515. This also may be accomplished as described previously in FIG. 2. The processor then provides an indication that the product is associated with a business partner (step 570). This may be accomplished, for example, by displaying an appropriate message or by returning a particular value to a calling computer program. The process 500 ends.

In some implementations, the processor may search for partner-product ranges that match both the identification of a business partner received in step 510 and the identification of a product received in step 515. Alternatively or additionally, a product category may be received for which a determination is to be made whether the product category is associated with the business partner. In some implementations, the processor may search for partner-product ranges that match the identification of a business partner received in step 510 and the identification of a product category.

In implementations in which a partner-product range identifies products that may be purchased by (or sold to) a business partner, an indication whether the business partner may purchase (or sell) the product may be provided in addition to, or in lieu of, the indication whether the product is associated with the business partner in steps 530 or 570. Similarly, in implementations in which partner-product range identifies products that may not be purchased by (or sold to) a business partner, an indication whether the business partner may not purchase (or sell) the product may be provided in addition to, or in lieu of, the indication whether the product is associated with the business partner in steps 530 or 570.

In some implementations, additional filtering criteria may be used in a process to determine whether a product is associated with a business partner. In one example, an identification of a particular distribution channel may be received and partner-product ranges that apply to the particular distribution channel, the business partner and optionally the product are identified and used to determine whether the product and distribution channel are associated with a business partner.

Figure 6:
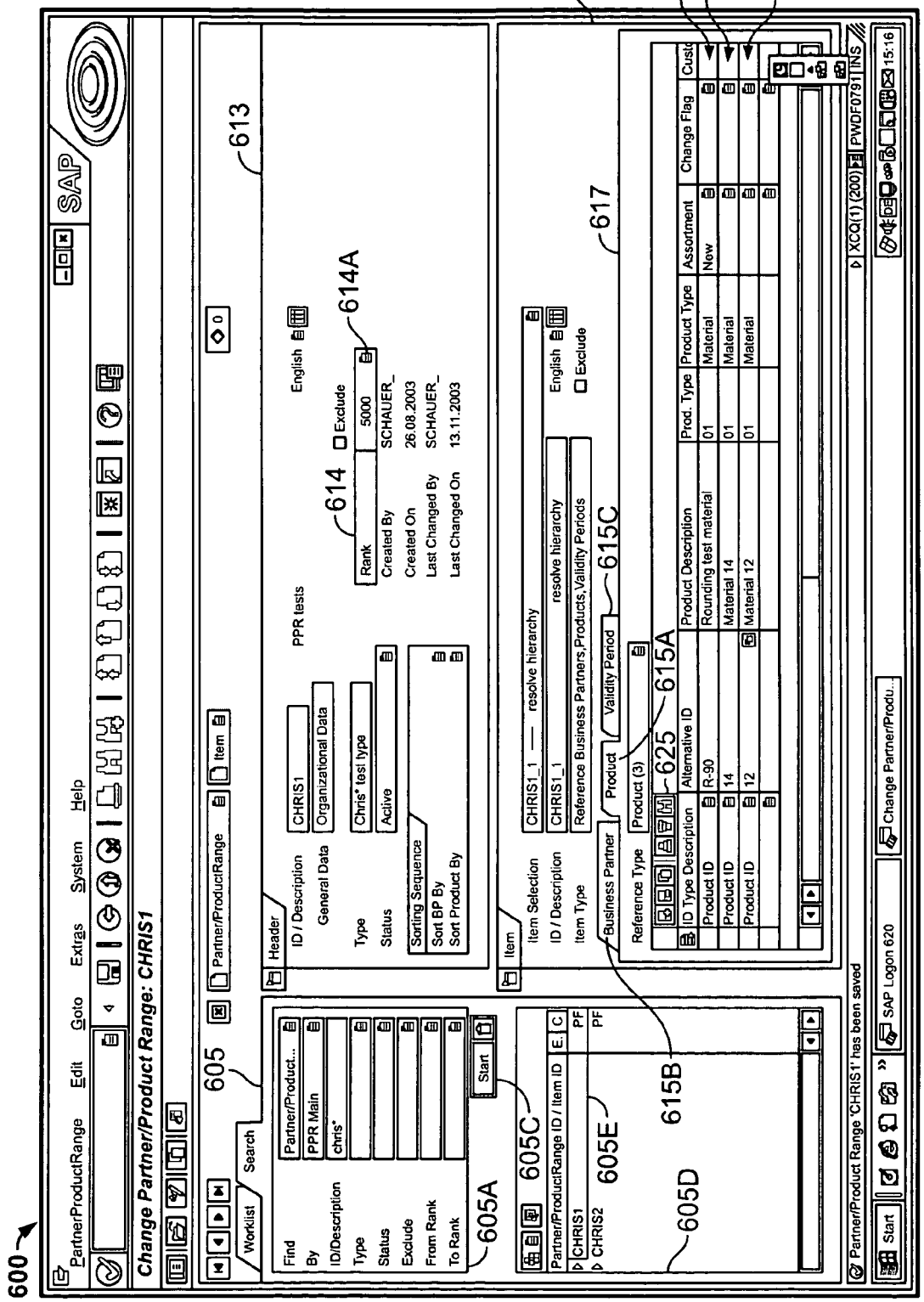
FIGS. 6, 7, and 8 are screen snapshots showing a user interface for entering and revising a partner-product range for prioritizing product information.
Figure 7:
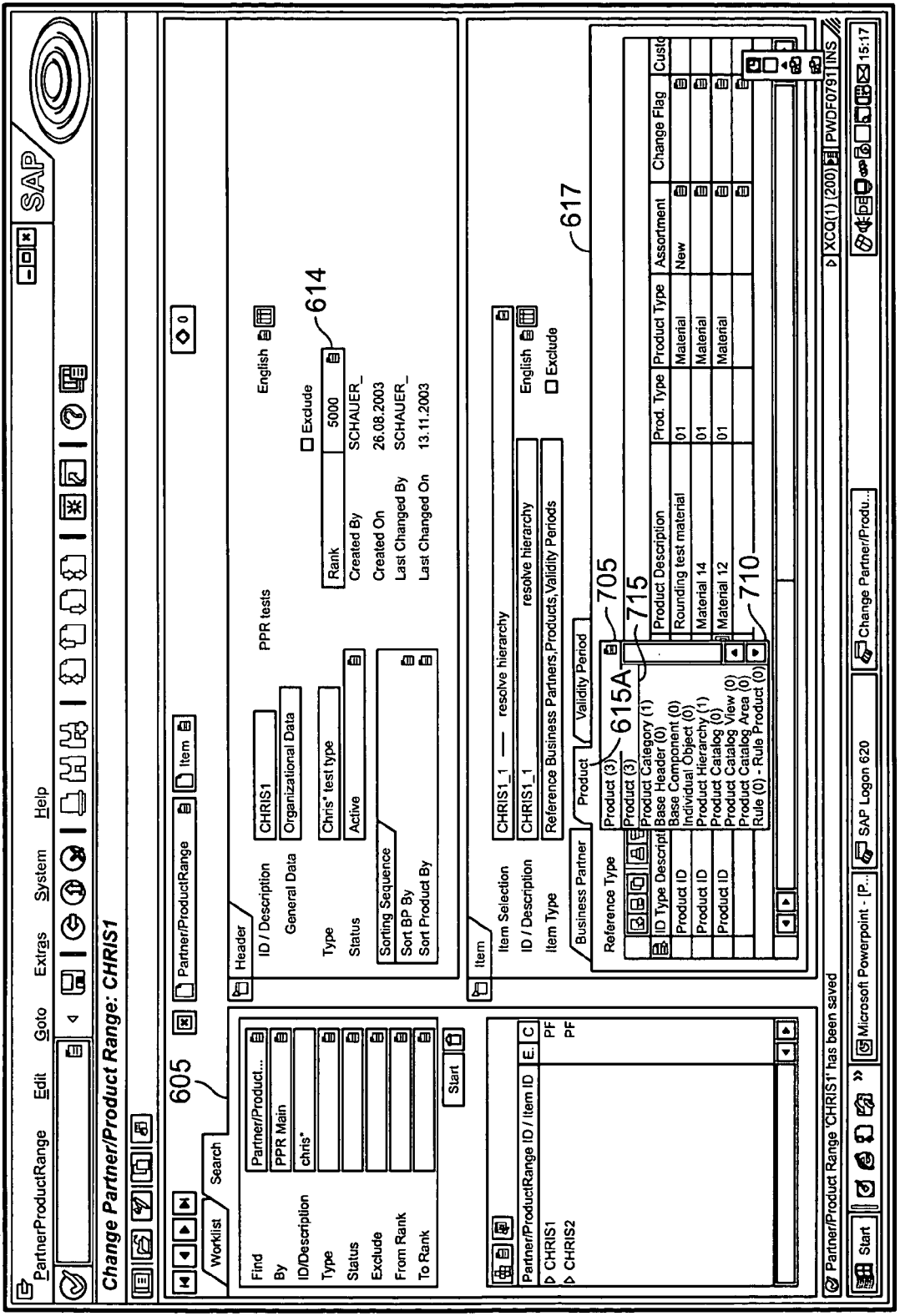
Figure 8:
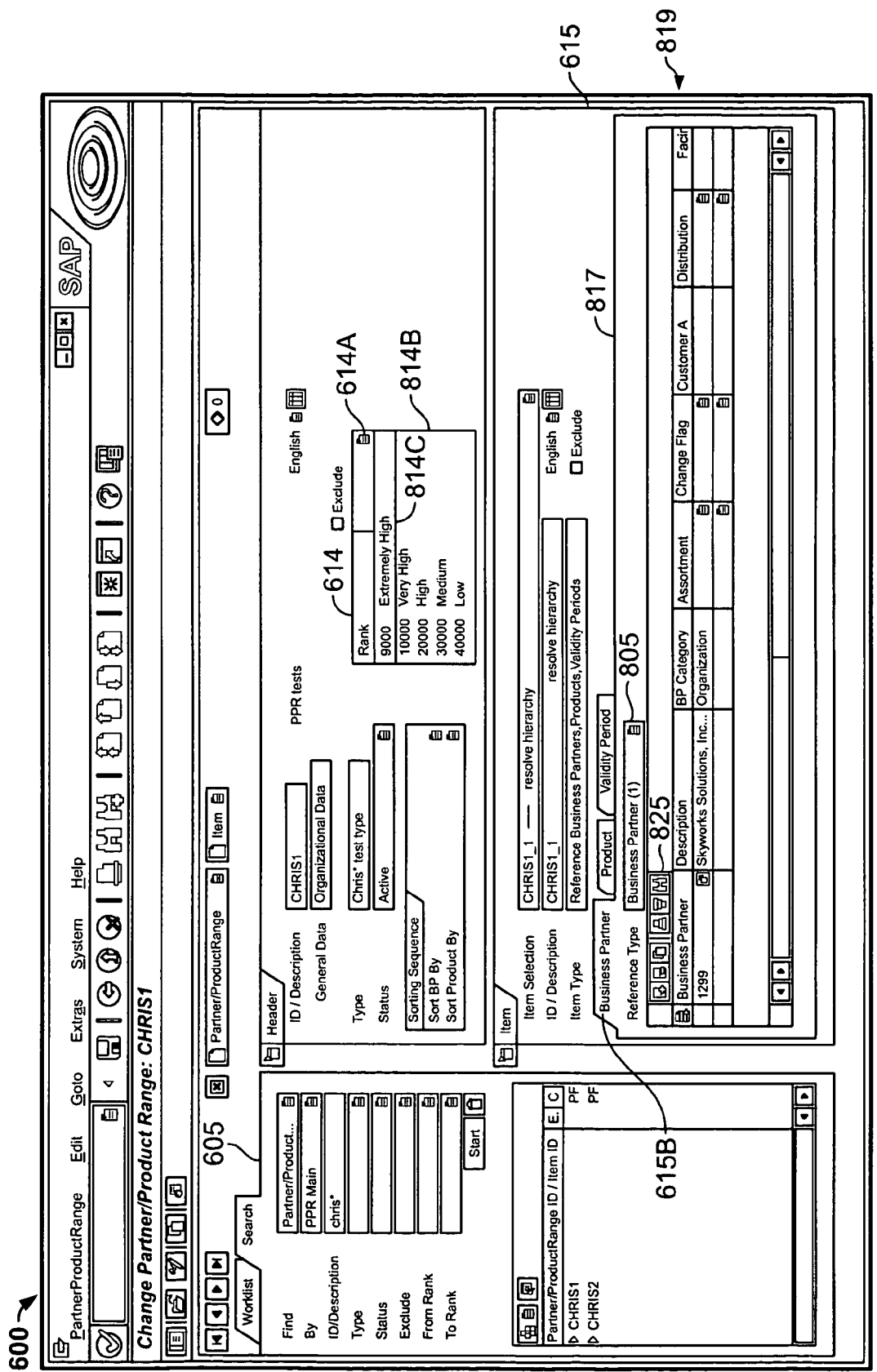

FIGS. 6, 7, and 8 illustrate a user interface 600 that may be used to enter and revise a partner-product range for prioritizing product information. The user interface 600 in FIG. 6 includes a search area 605 that may be used for searching for partner-product ranges and selecting one of the partner-product ranges identified by a search for display in other portions of the user interface 600. The search area 605 includes a portion 605A for entering and revising search criteria for identifying previously-defined partner-product ranges. The portion 605A allows a user to enter search parameters into fields, such as an identifier/description field 605B that may allow a user to specify a partner-product range identifier. The search area 605 also includes a control 605C for initiating a search based on the parameters entered in the search area 605. Results of the search are displayed in a search results area 605D. A user may select one of the partner-product ranges displayed in the search results area 605D. In this example, the partner-product range 605E (having an identifier of "CHRIS1") has been selected. Information related to the selected partner-product range are displayed in other portions of the user interface 600.

The user interface 600 displays information about the selected partner-product range in a partner-product range header display 613. The information displayed in the header display 613 may be an implementation of partner-product range information 310 in FIG. 3. The partner-product range header display 613 includes a partner-product range rank 614 that indicates a priority indication associated with the partner-product range. Here, the partner-product range priority indication is "5000." The partner-product range header display 613 also includes a control 614A for displaying multiple valid priority indications from which a user may select a priority indicator to be associated with the partner-product range.

The user interface 600 also has an item display 615 enables the display of detail information about the business partners associated with the selected partner-product range, the products or product categories associated with the selected partner-product range, and a validity period for the selected partner-product range. The type of detail information that is displayed by the item display 615 is controlled by activation of one of a product tab 615A, a business partner tab 615B or a validity period tab 615C.

As illustrated in FIG. 6, the product tab 615A is selected, which causes the display of product information 617 area including a list 619 of the products 619A, 619B and 619C that are associated with the selected partner-product range. The product list 619 contains information about the products including identifiers, descriptions, and product types. Using the edit controls 625, user may edit the information in the product list 619 and save any changes in the product information that is associated with the selected partner-product range.

As shown in FIG. 7, the product tab 615A is selected, as is a control 705 for selecting one of several product reference types. The control 705 allows a user to identify which of several product information types 710 are to be displayed in product information area 617. The user interface 600 also is able to display other types of information associated with products, including a product hierarchy and a product category.

FIG. 8 shows results of selecting the business partner tab 615B and selecting the control 805 to identify that the business partner is the type of information related to business partners that is to be displayed in a business partner information area 817. Here only, one business partner 819 is associated with the selected partner-product range. Using the edit controls 825, the user may edit the information in the business partner information 817 and save any changes in the business partner information that is associated with the selected partner-product range.

FIG. 8 also illustrates using the control 614A of the partner-product range header display 613 for displaying multiple valid priority indications 814B from which a user may select a priority indicator to be associated with the partner-product range. As illustrated, the priority indicator 814C (here, "5000—Extremely High") is selected.

Figure 9A:
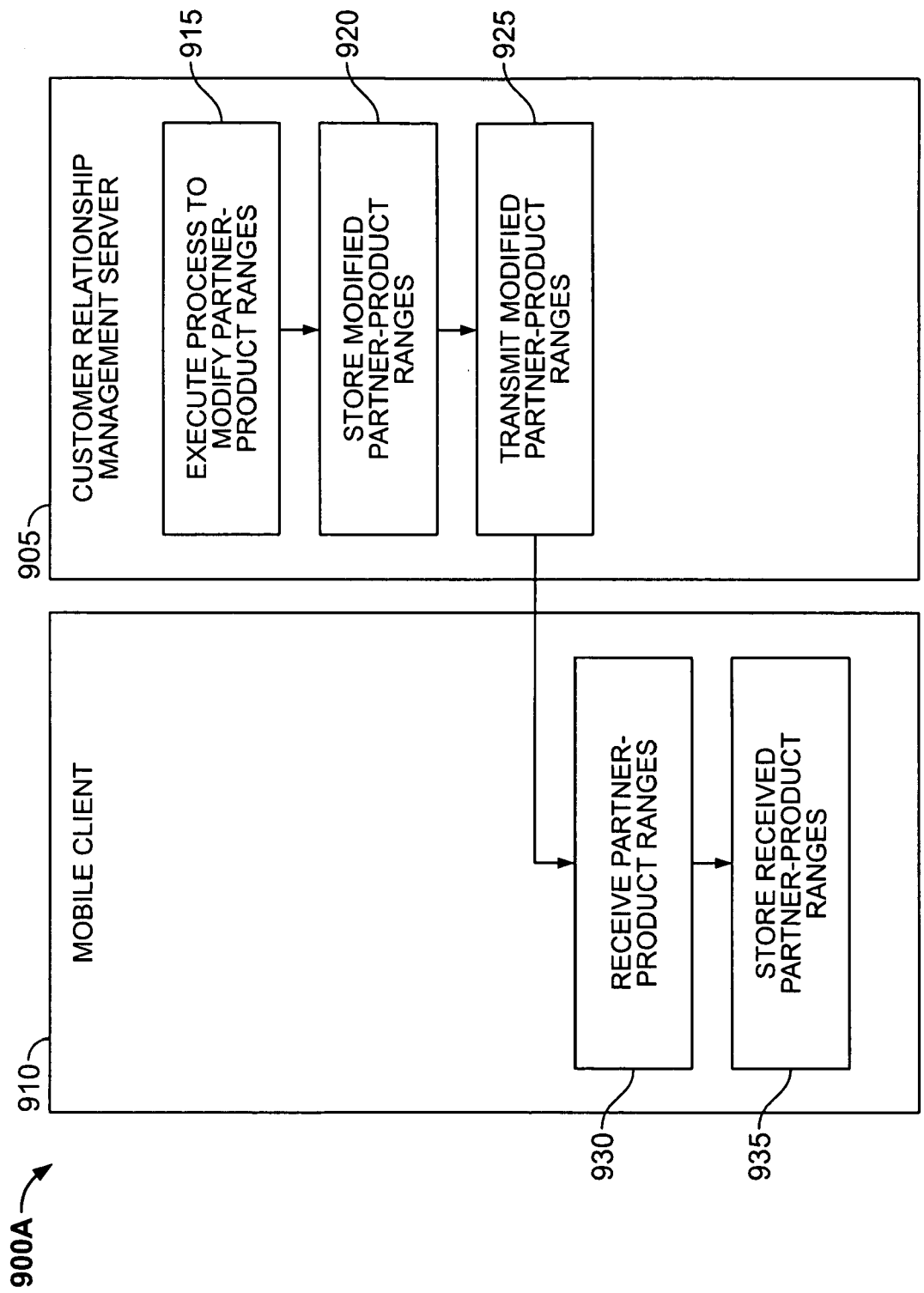
FIG. 9A is a diagram illustrating transmittal of partner product ranges from a customer relationship management server to a mobile client.

FIG. 9A shows a process 900A for using a CRM server to modify partner-product ranges used in a CRM system and transmitting the modified partner-product ranges to a mobile client 910. The execution of the process 900A may be initiated on the CRM server 905 by a system administrator, a business analyst or another type of user. The user may create a new partner-product range or modify a previously-defined partner-product range using the CRM server 905 to execute a process to modify partner-product ranges (step 915). This may be similar to the process 170 to create a partner-product range in FIG. 1 or the process 400 in FIG. 4. A user interface, such as user interface 600 in FIGS. 6-8, may be used to create or modify partner-product ranges.

The CRM stores the modified partner-product ranges (step 920) and transmits the modified partner-product ranges to the mobile client 910 (step 925). The transmission may be done by the CRM when a partner-product range is created or revised. Alternatively or additionally, the transmission may be initiated based on a request from the mobile client 910. The partner-product ranges are received at the mobile client 910 (step 930) and are stored (step 935).

In some implementations, the transmission may be directed and controlled by middleware. Middleware may direct data exchange messages between the CRM system 905 and the mobile client 910. The middleware may use different types of message structures to communicate different data structures.

Figure 9B:
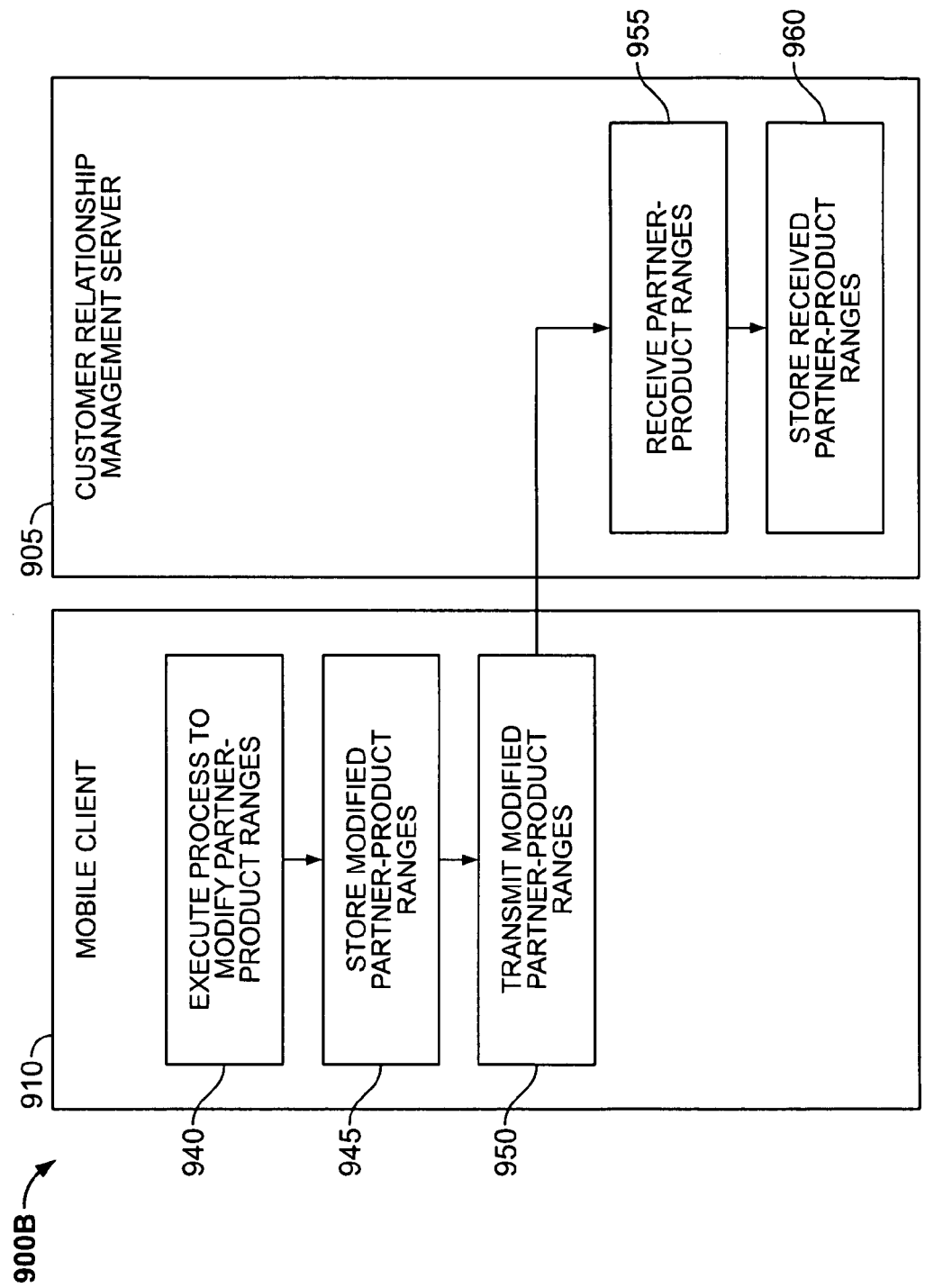
FIG. 9B is a diagram showing transmittal of partner product ranges from a mobile client to a customer relationship management server.

FIG. 9B shows a process 900B for using a mobile client 910 to modifying partner-product ranges and transmitting the modified partner-product ranges to a CRM server 905. The execution of the process 900B may be initiated on the mobile client 910 by a sales representative, a business analyst or another type of user. The user may create a new partner-product range or modify a previously-defined partner-product range using the mobile client 910 to execute a process to modify partner-product ranges (step 940). This may be similar to the process 170 to create a partner-product range in FIG. 1, the process 400 in FIG. 4 or the process 915 in FIG. 9A. A user interface, such as user interface 600 in FIGS. 6-8, may be used to create or modify partner-product ranges.

The mobile client stores the modified partner-product ranges (step 945) and transmits the modified partner-product ranges to the CRM server 905 (step 950). The transmission may be initiated by the mobile client in response to an indication that a partner-product range has been created or revised. The partner-product ranges are received at the CRM server 905 (step 955) and are stored (step 960).

In some implementations, the transmission may be directed and controlled by middleware. Middleware may direct data exchange messages between the CRM system 905 and the mobile client 910. The middleware may use different types of message structures to communicate different data structures.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

Nevertheless, it will be understood that various modifications may be made without departing from the spirit and scope of the invention. Accordingly, other implementations are within the scope of the following claims.

What is claimed is:

1. A computer program product tangibly embodied in a machine readable-storage device, the computer program product including instructions that, when executed, prioritize associations of products and business entities in a data collection, the computer program product configured to:

receive information associating a particular product from a group of associated particular products identified in the data collection with a particular business entity identified in the data collection, wherein:

the particular business entity is associated in the data collection with multiple data entries that each identify one or more product associations between one or more particular products from the group of associated particular products and the particular business entity, and each of the multiple data entries has a priority indication associated therewith; and storing an indication of the received information associating the particular product in one or more of the multiple data entries in the data collection for use in:

determining, in response to a received request, which of the multiple data entries associated with the particular business entity and identifying one or more product associations between the one or more particular products from the group of associated particular products and the particular business entity includes a higher priority indication, and using a data entry of the multiple data entries that includes the higher priority indication to determine whether a product from a group of associated particular products identified in the data collection is associated with the particular business entity.

2. The computer program product of claim 1 further configured to receive multiple priority indications wherein:

each of the multiple priority indications is associable with a data entry of the multiple data entries, and the multiple priority indications are received before the information associating the particular product from a group of associated particular products identified in the data collection with the particular business entity identified in the data collection is received.

3. The computer program product of claim 1 wherein:

products identified in the data collection are associated with one of multiple product categories, and at least one of the multiple data entries associated with the particular business entity identify at least one of the product associations based on an association of a product identified in the data collection with one of the multiple product categories.

4. The computer program product of claim 1 wherein:

business entities identified in the data collection are associated with one of multiple business entity categories, and at least one of the multiple data entries associated with the particular business entity identify the particular business entity based on an association of the particular business entity identified in the data collection with one of the multiple product categories.

5. The computer program product of claim 1 wherein:

business entities identified in the data collection are organized into a business entity hierarchy, and at least one of the multiple data entries associated with the particular business entity identify the particular business entity based on an association of the particular business entity with another business entity in the business entity hierarchy.

6. The computer program product of claim 1 wherein:

products identified in the data collection are organized into a product hierarchy, and at least one of the multiple data entries associated with the particular business entity identify at least one of the product associations based on an association of the product with another product in the product hierarchy.

7. The computer program product of claim 1 wherein:

the information received includes a validity period, at least one of the multiple data entries associated with the particular business entity is stored in the data collection and the at least one of the multiple data entries includes the validity period for use in determining which of the multiple data entries includes the higher priority indication and using the data entry of the multiple data entries that includes the higher priority indication and the validity period.

8. The computer program product of claim 1 wherein at least one of the multiple data entries associated with the particular business entity indicates that the particular business entity is permitted to sell a product identified by the one or more product associations.

9. The computer program product of claim 1 wherein at least one of the multiple data entries associated with the particular business entity indicates that the particular business entity is not permitted to sell a product identified by the one or more product associations.

10. The computer program product of claim 1 wherein at least one of the multiple data entries associated with the particular business entity indicates that the particular business entity is permitted to purchase a product identified by the one or more product associations.

11. The computer program product of claim 1 wherein at least one of the multiple data entries associated with the particular business entity indicates that the particular business entity is not permitted to purchase a product identified by the one or more product associations.

12. A computer-implemented method for prioritizing associations of products and business entities in a data collection, the method comprising:

receiving information associating a particular product from a group of associated particular products identified in the data collection with a particular business entity identified in the data collection, wherein:

the particular business entity is associated in the data collection with multiple data entries that each identify one or more products associations between one or more particular products from the group of associated particular products and the particular business entity and each of the multiple data entries has a priority indication associated therewith; and storing an indication of the received information associating the particular product in one or more of the multiple data entries in the data collection for use in:

determining, in response to a received request, which of the multiple data entries associated with the particular business entity and identifying one or more product associations between the one or more particular products from the group of associated particular products and the particular business entity includes a higher priority indication, and using a data entry of the multiple data entries that includes the higher priority indication to determine whether a product from a group of associated particular products identified in the data collection is associated with the particular business entity.

13. The method of claim 12 further comprising receiving multiple priority indications wherein:

each of the multiple priority indications is associable with a data entry of the multiple data entries, and the multiple priority indications are received before the information associating the particular product from a group of associated particular products identified in the data collection with the particular business entity identified in the data collection is received.

14. The method of claim 12 wherein:

products identified in the data collection are associated with one of multiple product categories, and at least one of the multiple data entries associated with the particular business entity identify at least one of the product associations based on an association of a product identified in the data collection with one of the multiple product categories.

15. The method of claim 12 wherein:

business entities identified in the data collection are associated with one of multiple business entity categories, and at least one of the multiple data entries associated with the particular business entity identify the particular business entity based on an association of the particular business entity identified in the data collection with one of the multiple product categories.

16. The method of claim 12 wherein:
business entities identified in the data collection are organized into a business entity hierarchy, and
at least one of the multiple data entries associated with the particular business entity identify the particular business entity based on an association of the particular business entity with another business entity in the business entity hierarchy.

17. The method of claim 12 wherein:
products identified in the data collection are organized into a product hierarchy, and
at least one of the multiple data entries associated with the particular business entity identify at least one of the product associations based on an association of the product with another product in the product hierarchy.

18. The method of claim 12 wherein:
the information received includes a validity period,
at least one of the multiple data entries associated with the particular business entity is stored in the data collection and the at least one of the multiple data entries includes the validity period for use in determining which of the multiple data entries includes the higher priority indication and using the data entry of the multiple data entries that includes the higher priority indication and the validity period.

19. A system for prioritizing associations of products and business entities in a data collection, the system comprising a processor connected to a storage device and one or more input/output devices, wherein the processor is configured to:
receive receiving information associating a particular product from a group of associated particular products identified in the data collection with a particular business entity identified in the data collection, wherein:
the particular business entity is associated in the data collection with multiple data entries that each identify one or more products associations between one or more particular products from the group of associated particular products and the particular business entity and
each of the multiple data entries has a priority indication associated therewith; and store an indication of the received information associating the particular product in one or more of the multiple data entries in the data collection for use in:
determining, in response to a received request, which of the multiple data entries associated with the particular business entity and identifying one or more product associations between the one or more particular products from the group of associated particular products and the particular business entity includes a higher priority indication, and
using a data entry of the multiple data entries that includes the higher priority indication to determine whether a product from a group of associated particular products identified in the data collection is associated with the particular business entity.

20. The system of claim 19 wherein the processor is further configured to receive multiple priority indications wherein:
each of the multiple priority indications is associable with a data entry of the multiple data entries, and
the multiple priority indications are received before the information associating the particular product from a group of associated particular products identified in the data collection with the particular business entity identified in the data collection is received.

21. A computer program product tangibly embodied in a machine readable-storage device, the computer program product including instructions that, when executed, prioritize associations of products and business entities in a data collection, the computer program product configured to:
receive information associating a particular product within a hierarchy relating products identified in the data collection with a particular business entity within a hierarchy relating business entities identified in the data collection, wherein:
the particular business entity is associated in the data collection with multiple data entries that each identify one or more product associations between one or more particular products within the hierarchy relating products and the particular business entity within the hierarchy relating business entities,
at least one of the multiple data entries associated with the particular business entity identifies either one or both of:
the particular business entity based on an association of the particular business entity with another business entity in the hierarchy relating business entities, or
at least one of the product associations based on an association of the product with another product in the hierarchy relating products, and
each of the multiple data entries has a priority indication associated therewith; and
storing an indication of the received information associating the particular product in one or more of the multiple data entries in the data collection for use in:
determining, in response to a received request, which of the multiple data entries associated with the particular business entity within the hierarchy relating business entities and identifying one or more product associations between the one or more particular products within the hierarchy relating products and the particular business entity within the hierarchy relating business entities includes a higher priority indication, and
using a data entry of the multiple data entries that includes the higher priority indication to determine whether a product within a hierarchy relating products identified in the data collection is associated with the particular business entity within a hierarchy relating business entities.

* * * * *